US012629752B2

(12) United States Patent
Liu et al.

(10) Patent No.: US 12,629,752 B2
(45) Date of Patent: May 19, 2026

(54) METHOD OF PREPARING ALUMINUM-CONTAINING ALLOY POWDER AND APPLICATION THEREOF

(71) Applicant: Li Liu, Guangdong (CN)

(72) Inventors: Li Liu, Guangdong (CN); Yuanyun Zhao, Guangdong (CN)

(73) Assignee: Li Liu, Dongguan (CN)

( * ) Notice: Subject to any disclaimer, the term of this patent is extended or adjusted under 35 U.S.C. 154(b) by 958 days.

(21) Appl. No.: 17/781,343

(22) PCT Filed: Nov. 23, 2020

(86) PCT No.: PCT/CN2020/130956
§ 371 (c)(1),
(2) Date: May 31, 2022

(87) PCT Pub. No.: WO2021/104219
PCT Pub. Date: Jun. 3, 2021

(65) Prior Publication Data
US 2023/0001481 A1 Jan. 5, 2023

(30) Foreign Application Priority Data

Nov. 28, 2019 (CN) .......................... 201911188404.7
Nov. 13, 2020 (CN) .......................... 202011273043.9

(51) Int. Cl.
*B22F 9/16* (2006.01)
*B22F 1/054* (2022.01)
(Continued)

(52) U.S. Cl.
CPC ............... *B22F 9/16* (2013.01); *B22F 1/054* (2022.01); *B33Y 40/10* (2020.01); *B33Y 70/00* (2014.12);
(Continued)

(58) Field of Classification Search
None
See application file for complete search history.

(56) References Cited

U.S. PATENT DOCUMENTS 4,191,561 A * 3/1980 Quinlan .................. C30B 29/62
252/79.4
2009/0250143 A1 10/2009 Fleury et al.

FOREIGN PATENT DOCUMENTS

CN 101214546 A * 7/2008
CN 102363217 A 2/2012
(Continued)

OTHER PUBLICATIONS

CN109576610A English language translation (Year: 2019).*
International Search Report of PCT/CN2020/130956.
Written Opinion of PCT/CN2020/130956.

*Primary Examiner* — Sally A Merkling
*Assistant Examiner* — Sean P. O'Keefe

(57) ABSTRACT

The present disclosure relates to a method of preparing an aluminum-containing alloy powder and an application thereof. The preparation method includes: by using the characteristic that a solidification structure of an initial alloy includes a matrix phase and a dispersed particle phase, the matrix phase is removed by reaction with an acid solution, so as to separate out the dispersed particle phase and obtain an aluminum-containing alloy powder. The preparation method is simple in process and can prepare different morphologies of aluminum-containing alloy powders of nano-level, sub-micron-level, micron-level and millimeter-level, which can be applied to the fields such as photo-electronic devices, wave absorbing materials, catalysts, 3D metal printing, metal injection molding and corrosion-resistant coating.

14 Claims, 5 Drawing Sheets

(51) Int. Cl.

| | |
|---|---|
| *B33Y 40/10* | (2020.01) |
| *B33Y 70/00* | (2020.01) |
| *C09D 5/10* | (2006.01) |
| *C22C 1/02* | (2006.01) |
| *C22C 3/00* | (2006.01) |

(52) U.S. Cl.
CPC ............. *C09D 5/103* (2013.01); *C22C 1/026* (2013.01); *B22F 2301/052* (2013.01); *C22C 3/00* (2013.01)

(56) References Cited

FOREIGN PATENT DOCUMENTS

| | | | | | |
|---|---|---|---|---|---|
| CN | 103317141 | A | * | 9/2013 | |
| CN | 105950915 | A | * | 9/2016 | ............. C22C 23/00 |
| CN | 106811750 | A | * | 6/2017 | |
| CN | 107012408 | A | * | 8/2017 | ............... C22C 1/11 |
| CN | 109576610 | A | | 4/2019 | |
| CN | 111334682 | A | | 6/2020 | |
| CN | 111347056 | A | | 6/2020 | |
| CN | 111590084 | A | | 8/2020 | |
| CN | 111940750 | A | | 11/2020 | |

* cited by examiner

METHOD OF PREPARING ALUMINUM-CONTAINING ALLOY POWDER AND APPLICATION THEREOF

CROSS-REFERENCE TO RELATED APPLICATIONS

This Application is a national stage application of PCT/CN2020/130956. This application claims priorities from PCT Application No. PCT/CN2020/130956, filed Nov. 23, 2020, and from Chinese patent applications 201911188404.7 filed Nov. 28, 2019, and 202011273043.9, filed Nov. 13, 2020, the content of which are incorporated herein in the entirety by reference.

TECHNICAL FIELD

The present invention relates to the field of metal material technologies, and in particular, to a method of preparing an aluminum-containing alloy powder and an application thereof and an alloy ribbon.

BACKGROUND

An alloy powder can be prepared by many methods, but each method has certain limitations. For example, the liquid phase method has the disadvantages of low production, high costs, being a complex process, and the like. The mechanical method is disadvantageous because it is difficult to grade a powder after preparation, and its purity, fineness and morphology cannot be guaranteed. The rotary electrode method and the gas atomization method are major methods for preparing a high performance alloy powder, but they have the disadvantages of low production efficiency and large energy consumption. The jet mill method and the hydrogenation and dehydrogenation method are suitable for industrialized production of large batches, but have high selectivity for primary metal and alloy. Furthermore, an impurity content, especially an oxygen content, of a metal powder or an alloy powder has a great impact on its performance. At present, the impurity content of the metal powder or the alloy powder is mainly controlled by controlling raw material purity and vacuum degree, leading to high costs. Therefore, it is of great significance to develop a new method of preparing a high purity alloy powder material.

SUMMARY

In view of the above, it is necessary to provide a method of preparing an aluminum-containing alloy powder and an application thereof for the above problems.

The method of preparing an aluminum-containing alloy powder includes the following steps:

At step 1, selecting initial alloy raw materials, melting the initial alloy raw materials based on an ingredient ratio of the initial alloy to obtain a homogeneous initial alloy melt; where a major ingredient of the initial alloy melt is $RE_aAl_bM_cT_d$, RE includes at least one of Y, La, Ce, Pr, Nd, Pm, Sm, Eu, Gd, Tb, Dy, Ho, Er, Tm, Yb, and Lu, M includes at least one of W, Cr, Mo, V, Ta, Nb, Zr, Hf, Ti, Fe, Co and Ni; T is an impurity element including at least one of O, H, N, P, S, F, and Cl; a, b, c and d represent atomic percent contents of corresponding constituent elements respectively and $35\% \leq a \leq 99.7\%$, $0.1\% \leq b \leq 25\%$, $0.1\% \leq c \leq 35\%$, $0 \leq d \leq 10\%$;

at step 2, solidifying the initial alloy melt into an initial alloy ribbon; wherein a solidification structure of the initial alloy ribbon includes a matrix phase and a dispersed particle phase; a melting point of the matrix phase is lower than that of the dispersed particle phase and the dispersed particle phase is wrapped in the matrix phase; an average ingredient of the matrix phase mainly is $RE_{x1}Al_{y1}T_{z1}$, an ingredient of the dispersed particle phase mainly is $M_{x2}Al_{y2}T_{z2}$, x1, y1, z1, x2, y2 and z2 represent atomic percent contents of corresponding constituent elements respectively, and $60\% \leq x1 < 99.8\%$, $0.2\% \leq y1 \leq 30\%$, $0 \leq z1 \leq 30\%$; $80\% \leq x2 \leq 99.8\%$, $0.1\% \leq y2 \leq 22\%$, $0 \leq z2 \leq 1.5\%$ and $z2 \leq d \leq z1$; during the solidification process of the initial alloy melt, the impurity element T in the initial alloy melt is redistributed in the dispersed particle phase and the matrix phase and enriched in the matrix phase so as to purify the dispersed particle phase;

at step 3, reacting the initial alloy ribbon with an acid solution, wherein the matrix phase in the initial alloy ribbon reacts with an acid to change into an ion entering the solution and the dispersed particle phase not reacting with the acid solution is separated out from the initial alloy ribbon to obtain an aluminum-containing alloy powder material with major ingredient being $M_{x2}Al_{y2}T_{z2}$.

In step 1,

Furthermore, the impurity element in the initial alloy melt comes from a source including: impurity introduced by the initial alloy raw material and impurity introduced by atmosphere or crucible in a melting process. The atmosphere-introduced impurity refers to impurities such as O, N and H in an environmental atmosphere, which are absorbed by the alloy melt.

Furthermore, the initial alloy raw material includes a M-T raw material including the impurity element T. For example, when M is Ti and T includes O, the M-T raw material includes a Ti—O raw material containing O impurity.

Furthermore, T is an impurity element including at least one of O, H, N, P, S, F and Cl; a total content of these impurity elements is the content of the impurity element T.

Furthermore, preferably, $0 < d \leq 10\%$.

Furthermore, preferably, M includes at least one of W, Cr, Mo, V, Ta, Nb, Zr, Hf, Ti, Fe, Co and Ni, and when M includes at least one of Fe, Co and Ni, M further includes at least one of W, Cr, Mo, V, Ta, Nb, Zr, Hf and Ti at the same time.

Furthermore, M includes at least one of W, Cr, Mo, V, Ta, Nb, Zr, Hf and Ti.

In step 2,

Furthermore, the initial alloy ribbon does not contain an intermetallic compound formed by RE and M.

Furthermore, the alloy melt can be solidified by melt spinning or continuous casting. Generally, a thin initial alloy ribbon can be obtained by melt spinning; a thick initial alloy ribbon can be obtained by continuous casting.

Furthermore, regardless of the thin alloy ribbon obtained by melt spinning and the thick alloy ribbon obtained by continuous casting, both are totally different in morphology from an alloy ingot obtained by ordinary casting. Usually, the alloy ingot obtained by ordinary casting has no obvious comparison of length and thickness.

Furthermore, a thickness of the initial alloy ribbon is in a range of 5 μm to 50 mm. Furthermore, a thickness of the initial alloy ribbon is in a range of 5 μm to 5 mm Preferably, the thickness of the initial alloy ribbon is in a range of 5 μm to 1 mm Preferably, the thickness of the initial alloy ribbon is in a range of 5 μm to 200 μm. Preferably, the thickness of the initial alloy ribbon is in a range of 5 μm to 20 μm.

It is noted that, when the thickness of the initial alloy ribbon is of millimeter level, the ribbon may also be called an alloy sheet.

Furthermore, a width of a cross section of the initial alloy ribbon is two or more times of its thickness.

Furthermore, a length of the initial alloy ribbon is 10 or more times of its thickness.

Preferably, the length of the initial alloy ribbon is 50 or more times of its thickness.

Preferably, the length of the initial alloy ribbon is 100 or more times of its thickness.

Furthermore, a solidification rate of the initial alloy melt is in a range of 1 K/s to $10^7$ K/s.

Furthermore, a particle size of the dispersed particle phase is related to the solidification rate of the initial alloy melt; usually, the particle size of the dispersed particle phase is in a negative correlation relationship with the solidification rate of the initial alloy melt, that is, the larger the solidification rate of the initial alloy melt is, the smaller the particle size of the dispersed particle phase is.

Furthermore, the particle size of the dispersed particle phase is in a range of 2 nm to 3 mm. Furthermore, the particle size of the dispersed particle phase is in a range of 2 nm to 500 μm; preferably, the particle size of the dispersed particle phase is in a range of 2 nm to 99 μm; further preferably, the particle size of the dispersed particle phase is in a range of 2 nm to 5 μm; further preferably, the particle size of the dispersed particle phase is in a range of 2 nm to 200 nm; further preferably, the particle size of the dispersed particle phase is in a range of 2 nm to 100 nm.

Furthermore, when the solidification rate of the initial alloy melt is $10^5$ K/s to $10^7$ K/s, dispersed particles with major particle size of nano-level can be obtained.

Furthermore, when the solidification rate of the initial alloy melt is $10^4$ K/s to $10^5$ K/s, dispersed particles with major particle size of sub-micron-level can be obtained.

Furthermore, when the solidification rate of the initial alloy melt is $10^2$ K/s to $10^4$ K/s, dispersed particles with major particle size of micron-level can be obtained.

Furthermore, when the solidification rate of the initial alloy melt is 1 K/s to $10^2$ K/s, dispersed particles with major particle size of millimeter-level can be obtained.

Furthermore, a particle shape of the dispersed particle phase is not limited and may include at least one of dendritic shape, spheroidal shape, sub-spheroidal shape, square shape, pie shape and rod shape; when the particle shape is a rod shape, the particle size specifically refers to a diameter size of a cross section of the rod.

Furthermore, the dispersed particle phase is solidified and separated out from the initial alloy melt. Based on nucleation growth theory, regardless of the sub-spheroidal nano-particles in which nucleation grows up newly and micron-level or millimeter-level fully-grown dendritic particles in which nucleation is fully grown up, their crystal growths have fixed orientation relationship, such that the separated single particle is mainly made of one mono-crystal.

When a volume percent content of the dispersed particles in the entire initial alloy ribbon is high, it is possible that there is a case that two or more particles are combined in an endogenous separation of mono-crystalline particles. If two or more monocrystalline particles are only softly agglomerated, or mutually attracted or connected together only by a small part contact and are not fully combined into one particle through normal grain boundary like polycrystalline materials, they are still two mono-crystalline particles. It is characterized in that, after the matrix is removed in a subsequent process, these mono-crystalline particles can be easily separated by techniques such as ultrasonic dispersion processing and jet mill crushing. The polycrystalline materials of normal tough metals or alloys cannot be easily separated for grain boundary by the techniques such as ultrasonic dispersion processing and jet mill crushing, Preferably, a ratio of a number of monocrystalline particles of the dispersed particles in the initial alloy ribbon to a total number of dispersed particles is not less than 75%.

Further preferably, the ratio of the number of mono-crystalline particles of the dispersed particles to the total number of dispersed particles is not less than 90%.

Furthermore, a volume percent content of the dispersed particle phase in the initial alloy ribbon is not greater than 40%.

Furthermore, c≤35%, the RE element mainly is rare earth element of large atoms and its atomic weight is commonly higher than an atomic weight of the M element. Therefore, when the atomic percent content of the M element in the alloy melt is controlled to be less than 35%, the volume percent content of the dispersed particle phase mainly made of M element is usually not greater than 35%.

Furthermore, an atomic percent content of the Al element in the matrix phase with an average ingredient mainly being $RE_{x1}Al_{y1}T_{z1}$ is higher than its atomic percent content in the dispersed particle phase with an ingredient mainly being $M_{x2}Al_{y2}T_{z2}$, that is, y1>y2.

Furthermore, z2 is less than an atomic percent content of the impurity element T in the M-T raw material, that is, the atomic percent content of the impurity element T in the dispersed particle phase with an ingredient mainly being $M_{x2}Al_{y2}T_{z2}$ is lower than the atomic percent content of the impurity element T in the M-T raw material.

Furthermore, z2≤d≤z1 and 2z2≤z1.

Preferably, z2≤d≤z1 and 3z2≤z1.

Furthermore, z2≤d≤z1, 3z2≤z1, and 0≤z2≤1.5%.

Preferably, 0<z2<d<z1, 3z2<z1, and 0<z2≤1.5%. That is, the content of the impurity T in the dispersed particle phase is lower than the content of the impurity T in the initial alloy melt, and three times of the content of the impurity T in the dispersed particle phase is still lower than the content of the impurity T in the matrix phase.

Preferably, 68%≤x1<99.7%, 0.2%≤y1≤30%, 0<z1≤30%; 77%≤x2≤99.8%, 0.1%≤y2≤22%, 0<z2≤1.5%, z2<d<z1.

Further preferably, 0<z2<d<z1, 3z2<z1, and 0<z2≤0.75%.

In the present disclosure, the content of the impurity T is expressed by using atomic percent content. By representing the composition of various elements by using atomic percent contents of the elements, an increase or decrease change of the content of the elements, for example, the increase or decrease change of the impurity element, can be accurately expressed by using the concept of amount of substance. If the contents of various elements are represented by using weight percent contents (or PPM concept) of the elements, since the elements have different atomic weights, it is easy to make an incorrect conclusion. For example, if an alloy with an atomic percent content being $Ti_{45}Gd_{45}O_{10}$ contains 100 atoms, the atomic percent content of O is 10 at %. The 100 atoms are divided into two parts: $Ti_{45}O_4$ (atomic percent composition is $Ti_{91.8}O_{8.2}$) and $Gd_{45}O_6$ (atomic percent composition is $Gd_{88.2}O_{11.8}$). The atomic percent content of oxygen in $Gd_{45}O_6$ is increased to 11.8 at %, and the atomic percent content of oxygen in $Ti_{45}O_4$ is decreased to 8.2 at %, and thus it can be accurately expressed that O is enriched in Gd. If the weight percent content of O as measure, the weight percent content of O in $Ti_{45}Gd_{45}O_{10}$ is 1.70 wt %, the weight percent contents of O in $Ti_{45}O_4$ and $Gd_{45}O_6$ are 2.9 wt. % and 1.34 wt. % respectively, and an incorrect conclusion that the content of O in $Ti_{45}O_4$ is obviously increased compared with the content of O in $Gd_{45}O_6$ may be made.

In step 3, furthermore, the acid in the acid solution includes at least one of sulfuric acid, hydrochloric acid, nitric acid, perchloric acid, phosphoric acid, acetic acid, oxalic acid, formic acid and carbonic acid.

Furthermore, a molar concentration of the acid is in a range of 0.01 mol/L to 10 mol/L.

Furthermore, a temperature of the reaction between the initial alloy ribbon and the acid solution is in a range of 0° C. to 100° C., and a time of the reaction is in a range of 0.1 min to 24 h.

Furthermore, the particle size of the aluminum-containing alloy powder material is in a range of 2 nm to 3 mm.

Preferably, the particle size of the aluminum-containing alloy powder material is in a range of 2 nm to 500 μm.

Preferably, the particle size of the aluminum-containing alloy powder material is in a range of 2 nm to 99 μm.

Further preferably, the particle size of the aluminum-containing alloy powder material is in a range of 2 nm to 10 μm.

Further preferably, the particle size of the aluminum-containing alloy powder material is in a range of 2 nm to 1 μm.

Further preferably, the particle size of the aluminum-containing alloy powder material is in a range of 2 nm to 200 nm.

Further preferably, the particle size of the aluminum-containing alloy powder material is in a range of 2 nm to 100 nm.

Furthermore, after the initial alloy ribbon reacts with the acid solution, the dispersed particles are separated from the initial alloy ribbon and cleaned and dried to obtain an aluminum-containing alloy powder material with major ingredient being $M_{x2}Al_{y2}T_{z2}$.

Furthermore, after the step 3, the method further includes the following steps: screening the aluminum-containing alloy powder material, and then selecting the aluminum-containing alloy powder material with a particle size being 5 μm to 200 μm for plasma spheroidization to obtain a spheroidal aluminum-containing alloy powder material.

Furthermore, a particle size of the spheroidal aluminum-containing alloy powder is in a range of 5 μm to 200 μm.

Furthermore, the present disclosure further provides an application of the aluminum-containing alloy powder or the spheroidal aluminum-containing alloy powder material obtained by the above preparation method in photo-electronic devices, wave absorbing materials, catalysts, powder metallurgy, 3D metal printing, metal injection molding and coating.

Furthermore, in the application of the spheroidal aluminum-containing alloy powder material obtained by the above preparation method in 3D metal printing, the particle size of the spheroidal aluminum-containing alloy powder is in a range of 5 μm to 200 μm.

Furthermore, in the application of the aluminum-containing alloy powder or the spheroidal aluminum-containing alloy powder obtained by the above preparation method in metal injection molding and powder metallurgy, the particle size of the aluminum-containing alloy powder or the spheroidal aluminum-containing alloy powder is in a range of 0.1 μm to 50 μm.

Furthermore, in the application of the aluminum-containing alloy powder obtained by the above preparation method in coating, the particle size of the aluminum-containing alloy powder is in a range of 2 nm to 5 μm.

The present disclosure further provides an alloy ribbon, including an endogenous aluminum-containing alloy powder and a wrapping body; where a solidification structure of the alloy ribbon includes a matrix phase and a dispersed particle phase, the matrix phase is the wrapping body, and the dispersed particle phase is the endogenous aluminum-containing alloy powder; a melting point of the wrapping body is lower than that of the endogenous aluminum-containing alloy powder, and the endogenous aluminum-containing alloy powder is wrapped in the wrapping body; an average ingredient of the wrapping body mainly is $RE_{x1}Al_{y1}T_{z1}$, an ingredient of the endogenous aluminum-containing alloy powder mainly is $M_{x2}Al_{y2}T_{z2}$, x1, y1, z1, x2, y2 and z2 represent atomic percent contents of corresponding constituent elements respectively, and $60\% \le x1 < 99.8\%$, $0.2\% \le y1 \le 30\%$; $0 \le z1 \le 30\%$; $80\% \le x2 \le 99.8\%$, $0.1\% \le y2 \le 22\%$, $0 \le z2 \le 1.5\%$, $z2 \le z1$ and $y1 > y2$; RE includes at least one of Y, La, Ce, Pr, Nd, Pm, Sm, Eu, Gd, Tb, Dy, Ho, Er, Tm, Yb and Lu, and M includes at least one of W, Cr, Mo, V, Ta, Nb, Zr, Hf, Ti, Fe, Co and Ni; T is an impurity element and includes at least one of O, H, N, P, S, F and Cl.

Preferably, M includes at least one of W, Cr, Mo, V, Ta, Nb, Zr, Hf, Ti, Fe, Co and Ni, and when M includes at least one of Fe, Co and Ni, M further includes at least one of W, Cr, Mo, V, Ta, Nb, Zr, Hf and Ti at the same time.

Further preferably, M includes at least one of W, Cr, Mo, V, Ta, Nb, Zr, Hf and Ti.

Furthermore, a thickness of the alloy ribbon is in a range of 5 μm to 50 mm.

Preferably, the thickness of the alloy ribbon is in a range of 5 μm to 5 mm.

Preferably, the thickness of the alloy ribbon is in a range of 5 μm to 1 mm.

Further preferably, the thickness of the alloy ribbon is in a range of 5 μm to 200 μm.

Further preferably, the thickness of the alloy ribbon is in a range of 5 μm to 20 μm.

Furthermore, a width of a cross section of the alloy ribbon is two or more times of its thickness.

Furthermore, a length of the initial alloy ribbon is 10 or more times of its thickness.

Preferably, the length of the initial alloy ribbon is 50 or more times of its thickness.

Preferably, the length of the initial alloy ribbon is 100 or more times of its thickness.

Furthermore, a particle size of the endogenous aluminum-containing alloy powder is in a range of 2 nm to 3 mm.

Preferably, the particle size of the endogenous aluminum-containing alloy powder is in a range of 2 nm to 500 μm.

Preferably, the particle size of the endogenous aluminum-containing alloy powder is in a range of 2 nm to 99 μm.

Further preferably, the particle size of the endogenous aluminum-containing alloy powder is in a range of 2 nm to 10 μm.

Further preferably, the particle size of the endogenous aluminum-containing alloy powder is in a range of 2 nm to 1 μm.

Further preferably, the particle size of the endogenous aluminum-containing alloy powder is in a range of 2 nm to 200 nm.

Further preferably, the particle size of the endogenous aluminum-containing alloy powder is in a range of 2 nm to 100 nm.

Furthermore, a particle shape of the endogenous aluminum-containing alloy powder includes at least one of dendritic shape, spheroidal shape, sub-spheroidal shape, square shape, pie shape and rod shape.

Furthermore, a ratio of a number of mono-crystalline particles in the endogenous aluminum-containing alloy powder in the alloy ribbon to a total number of particles of the endogenous aluminum-containing alloy powder is not less than 75%.

Furthermore, the volume percent content of the endogenous aluminum-containing alloy powder in the alloy ribbon is not greater than 40%.

Furthermore, $2z2 \leq z1$ and $0 \leq z2 \leq 15\%$.

Preferably, $3z2 < z1$ and $0 < z2 \leq 15\%$.

Preferably, $68\% \leq x1 < 99.7\%$, $0.2\% \leq y1 \leq 30\%$, $0 < z1 \leq 30\%$; $77\% \leq x2 \leq 99.8\%$, $0.1\% \leq y2 \leq 22\%$, $0 < z2 \leq 1.5\%$, $z2 < d < z1$.

Further preferably, $3z2 < z1$ and $0 < z2 \leq 0.75\%$.

The above A, M and T may further contain other elements or impurity elements than the above listed elements. As long as the introduction or change of content of these elements do not cause an "essential" result to the solidification process and law of the initial alloy, the implementation of the above technical solutions of the present disclosure will not be affected.

Specifically, no occurrence of the "essential" result to the solidification process and law of the initial alloy refers to that when the A, M and T contains other elements or impurity elements than the above listed elements, factual processes and laws listed in the following 1) to 3) are still present.

1) The initial alloy ribbon does not contain the intermetallic compound mainly composed of RE and M.

2) The solidification structure of the initial alloy ribbon includes a matrix phase and a dispersed particle phase; the melting point of the matrix phase is lower than that of the dispersed particle phase, and the dispersed particle phase is wrapped in the matrix phase.

When the content of the impurity T of the initial alloy melt is not 0, the content of the impurity T of the dispersed particle phase is lower than the content of the impurity T of the initial alloy melt and two times of the content of the impurity T of the dispersed particle phase is still lower than the content of the impurity T of the matrix phase.

The technical solutions of the present disclosure have the following beneficial effects.

Firstly, solution treatment is achieved for Al in a metal or alloy containing W, Cr, Mo, V, Ta, Nb, Zr, Hf, Ti, Fe, Co and Ni and so on. In the above alloy material, the addition of the Al element is very important. For example, a titanium alloy Ti6Al4V alloy is applied most widely at present. For the Ti6Al4V alloy powder, a Ti6Al4V alloy melt is usually melted, and then the Ti6Al4V alloy powder is obtained by atomization powder making technology. Limited by atomization powder making technology, it is very difficult to obtain an ultrafine Ti6Al4V alloy powder, and even a nano-level Ti6Al4V alloy powder cannot be obtained by the atomization powder making technology. Therefore, it is of great significance to achieve addition of Al element to a Ti—V alloy by a "de-phasing" method mentioned in the present invention to prepare Ti6Al4V alloy powders of different particle sizes. The present invention skillfully finds that, when a considerable content of Al element (e.g. 10 at. % or higher) is added into the alloy formed of RE-M, the Al element in the alloy solidification structure may be present in the matrix phase mainly formed of RE and the dispersed particle phase mainly formed of M at the same time based on a given content distribution relationship. Because the RE-Al matrix phase can be easily removed by reaction with an acid, and Al in the Al-containing dispersed particle phase with M as main is protected by the inert element M and will not be easily removed by the acid (for example, the Ti6Al4V alloy has good acid corrosion resistance), it is possible to prepare an aluminum-containing titanium alloy powder by removing the matrix phase through reaction with the acid.

Secondly, by skillful element selection, it is ensured that intermetallic compound formed of RE and M is not generated in the initial alloy ribbon, such that target ingredient alloy particles containing Al and M can be formed in the solidification process of the initial alloy melt and separated in a subsequent process. In the present invention, a metal M containing impurity T, a metal Al and rare earth RE are selected to form an initial alloy melt with a major ingredient being $RE_aAl_bM_cT_d$ by melting. The solidification structure of the initial alloy melt is formed by a dispersed particle phase with a major ingredient being $M_{x2}Al_{y2}T_{z2}$ and a matrix phase with an average ingredient mainly being $RE_{x1}Al_{y1}T_{z1}$, which helps to separate the dispersed particle phase by reaction between the initial alloy ribbon and the acid solution. Specifically, when the initial alloy ribbon reacts with the acid solution, hydrogen ions in the acid solution reacts with the RE element and the Al element in the matrix phase to dissolve the RE element and the Al element into ions entering the solution. Al subjected to solution treatment in the dispersed particle phase with a major ingredient being $M_{x2}Al_{y2}T_{z2}$ is protected by the inert element M and not easy to react with the acid solution. Therefore, after the matrix phase is removed by reaction with the acid solution, the dispersed particle phase with a major ingredient being $M_{x2}Al_{y2}T_{z2}$ can be separated out in a dispersion manner to obtain an aluminum-containing alloy powder with a major ingredient being $M_{x2}Al_{y2}T_{z2}$. Based on different cooling rates of the initial alloy ribbon, the particle size of the dispersed particle phase with a major ingredient being $M_{x2}Al_{y2}T_{z2}$ may be nano-level, sub-micron-level, micron-level and even millimeter-level. In this case, the particle size of the aluminum-containing alloy powder prepared by it may also be nano-level, sub-micron-level, micron-level and even millimeter-level.

Thirdly, an aluminum-containing alloy powder with monocrystalline particles as main may be obtained. Compared with polycrystalline powder, the monocrystalline powder can obtain prominent and beneficial effects. In a solidification process of the initial alloy melt, Each endogenous dispersed particle is nucleated at a particular position in the melt and then grown up in a specific atomic arrangement manner. By controlling the volume percent content of the matrix phase, it is ensured that in a case that each endogenous particle that can be dispersed for distribution, combined growth is difficult to occur between the endogenous particles. Therefore, most of the finally-obtained dispersed particle phases are monocrystalline phase. For the dendritic particles with scale up to dozens of microns or millimeter-level, the growth direction of each secondary dendrite is in a phase relationship with that of the main dendrite and they still belong to monocrystalline particles. For a polycrystalline material, the grain boundary typically contains an impurity element drained from crystals in a solidification process, and thus, it is very difficult to obtain a high purity polycrystalline powder material. When a powder material is mainly composed of monocrystalline particles, its purity is necessarily guaranteed. Furthermore, the surface atoms of the monocrystalline particles have specific arrangement, for example, (111)-faced arrangement etc. These specific arrangements will endow the monocrystalline powder material special mechanical, physical and chemical performances, thereby resulting in beneficial effects.

Fourthly, a high purity aluminum-containing alloy powder is prepared using a low purity raw material, which proposes a new way to prepare a high purity metal powder material using a low purity raw material, bringing great significance. In the present invention, the purity of the high purity aluminum-containing alloy powder is improved mainly by the following two mechanisms: 1) absorption effect of rare earth RE for the impurity element T of the initial alloy melt. Since there is a strong affinity between the selected rare earth RE and the impurity element T, the impurity element T in the initial alloy melt may either enter, in a larger amount, the matrix phase mainly formed by the RE element or form molten slag with rare earth RE in a case of a molten state and removed by separating from the alloy melt; 2) during a nucleation growth process of the aluminum-containing endogenous alloy powder (endogenously separated dispersed particle phase), the impurity element T may be drained into the remaining melt. As long as the aluminum-containing endogenous alloy powder is separated out no later than the matrix phase in a solidification process, its impurity will be enriched in a finally-solidified melt portion, that is, the melt portion which is mainly composed of rare earth RE and solidified into the matrix phase. The result of the two mechanisms is that the impurity element T is enriched in the matrix phase mainly composed of rare earth RE and the aluminum-containing endogenous dispersed particle phase is purified. Furthermore, due to presence of a second phase matrix, the crucible interacts with the melt during a melting process such that the crucible-related impurities entering the melt are also generally enriched in the second phase matrix, which further reduces the content of the impurity of the aluminum-containing alloy powder. This way, requirements for the crucible in a melting process are further lowered, greatly reducing production costs.

Fifthly, in the alloy ribbon composed of the endogenous aluminum-containing alloy powder and the wrapping body, the in-situ generated matrix phase is used creatively to wrap the endogenous aluminum-containing alloy powder to maintain high purity and high activity of the endogenous aluminum-containing alloy powder. Specifically, for a metal alloy powder prepared by using a conventional chemical or physical method, especially a nanopowder with a extremely large specific surface area, it is extremely easily subjected to autoxidation and all are faced up with difficult storage of powder. For this problem, in one of the technical solutions of the present invention, after an alloy ribbon composed of an endogenous aluminum-containing alloy powder and a wrapping body is prepared, the wrapping body is not removed but directly used to protect the endogenous aluminum-containing alloy powder from autoxidation. The alloy ribbon composed of an endogenous aluminum-containing alloy powder and a wrapping body can be used directly as raw material for downstream production. Therefore, it has the potential to become one category of special products. When the downstream production needs to use a high purity endogenous aluminum-containing alloy powder, a proper time may be selected based on characteristics of a next procedure to release the endogenous aluminum-containing alloy powder from the wrapping body of the alloy ribbon by use of an acid solution in a proper environment and enable the released endogenous aluminum-containing alloy powder to enter a next production flow as soon as possible, such that the possibility that the aluminum-containing alloy powder is contaminated by the impurity such as oxygen is greatly reduced. For example, when the endogenous aluminum-containing alloy powder is a nanopowder, the aluminum-containing alloy powder may be compounded with resin while released from the wrapped body or immediately after being released from the wrapped body, so as to prepare a resin-based compound material added with a high activity aluminum-containing nano-alloy powder.

Sixthly, in step 2, a solid state alloy obtained by solidification in step 2 is a ribbon shape, and it ensures the homogeneity of product shape and the feasibility of mass production. When the alloy ribbon is a thin alloy ribbon, it can be prepared by using spinning. As long as a flow rate of the alloy melt flowing into a rotary roller is fixed and the rotation speed of the rotary roller is fixed, a thin alloy ribbon with a uniform thickness can be obtained. Furthermore, the preparation process can be carried out continuously, enabling mass production. When the alloy ribbon is a thick alloy ribbon, it can be prepared by a mature continuous casting with its principle similar to spinning, or a continuous thick ribbon with uniform thickness may be obtained by use of a melt, where the preparation process can be carried out continuously, helping mass production. When the alloy ribbon is of uniform thickness, the cooling rate is also uniform and the particle size of the obtained dispersed particles is also uniform. Comparatively, when the solid state alloy obtained by solidification is in the shape of a cast ingot, based on common knowledge, the cast ingot does not have uniform thickness nor obvious length and generally causes the internal melt to have difficulty in heat dissipation and thus an exceptionally large endogenous particles can be obtained easily. Such operations are required only when it is purely required to collect and purify large endogenous particles. Therefore, the alloy ribbon obtained by solidification in the present invention is suitable for use in preparing an aluminum-containing alloy powder material by using the "de-phasing" method subsequently.

Therefore, the preparation method of the present disclosure has the advantages of simple process, easy operation and low costs, and thus can prepare different morphologies of high purity aluminum-containing alloy powders of nano-level, sub-micron-level, micron-level and millimeter-level. The aluminum-containing alloy powders have good application prospect in the fields such as photo-electronic devices, absorbing materials, catalysts, powder metallurgy, 3D metal printing, metal injection molding and coating.

As an alternative solution, the present disclosure further provides a method of preparing an aluminum-containing alloy powder, including the following steps:

at step S1, providing an initial alloy, where an ingredient of the initial alloy is $RE_aAl_bM_c$, RE is selected from at least one of Y, La, Ce, Pr, Nd, Pm, Sm, Eu, Gd, Tb, Dy, Ho, Er, Tm, Yb, Lu, M is selected from at least one of W, Cr, Mo, V, Ta, Nb, Zr, Hf, Ti, a, b, and c represent atomic percent contents of corresponding constituent elements respectively and $0.1\% \leq b \leq 25\%$, $0.1\% \leq c \leq 35\%$, $a+b+c=100\%$, a solidification structure of the initial alloy includes a matrix phase and a dispersed particle phase, an average ingredient of the matrix phase is $RE_{x1}Al_{y1}$, an ingredient of the dispersed particle phase is $M_{x2}Al_{y2}$, x1, y1, x2 and y2 represent atomic percent contents of corresponding constituent elements respectively and $0.5\% \leq y1 \leq 30\%$, $0.1\% \leq y2 \leq 25\%$, $x1+y1=100\%$ and $x2+y2=100\%$;

at step S2, providing an acid solution, and mixing the initial alloy with the acid solution, such that the matrix phase in the initial alloy reacts with the acid solution to change into a metal ion, the dispersed particle phase in the initial alloy is separated to obtain an aluminum-containing alloy powder, where an ingredient of the aluminum-containing alloy powder is $M_{x2}Al_{y2}$.

In step S1, based on specific composition and content, raw materials required by the initial alloy $RE_aAl_bM_c$ are prepared by melting.

In step S1, the initial alloy can be obtained by the following sub-steps:

(1) weighing raw materials based a proportioning ratio;
(2) fully melting the raw materials to obtain an alloy melt;
(3) solidifying the alloy melt to obtain the initial alloy, wherein a rate of the solidification ranges from 0.001 K/s to $10^7$ K/s.

In the above sub-step (1), if the raw materials are a metal M, a metal Al and rare earth RE, the elements can be melted based on the proportioning ratio to prepare the initial alloy melt. If the provided raw material is directly the alloy $RE_aAl_bM_c$, the alloy $RE_aAl_bM_c$ can be re-melted to obtain an alloy melt. Of course, the metal M, the metal Al and rare earth RE may also be melted to prepare the alloy $RE_aAl_bM_c$ and the alloy $RE_aAl_bM_c$ is re-melted to obtain an alloy melt.

In the above sub-step (3), the solidification method is not limited and may include casting, melt spinning, melt extraction etc. A particle size and a morphology of the alloy powder formed finally is consistent with the particle size and the morphology of the dispersed particle phase with an ingredient being $M_{x2}Al_{y2}$ in the initial alloy, and the particle size of the dispersed particle phase with an ingredient being $M_{x2}Al_{y2}$ is related to the solidification rate of the alloy melt in the preparation process. Generally, the particle size of the dispersed particle phase with an ingredient being $M_{x2}Al_{y2}$ is in negative correlation relationship with a cooling rate of the alloy melt, that is, the larger the solidification rate of the alloy melt is, the smaller the particle size of the dispersed particle phase is. Therefore, the solidification rate of the alloy melt is preferably in a range of 0.001 K/s to $10^7$ K/s, such that the particle size of the dispersed particle phase with an ingredient being $M_{x2}Al_{y2}$ in the initial alloy is in a range of 2 nm to 50 mm, so as to prepare different morphologies of aluminum-containing alloy powders of nano-level, sub-micron-level, micron-level and millimeter-level.

In the above sub-step (3), a solidification structure of the initial alloy obtained by solidifying the alloy melt includes a matrix phase and a dispersed particle phase, and the dispersed particle phase is particle phase distributed in the matrix phase in a dispersion manner. An average ingredient of the matrix phase is $RE_{x1}Al_{y1}$, an ingredient of the dispersed particle phase is $M_{x2}Al_{y2}$, and a small amount of Al subjected to solution treatment in the dispersed particle phase with an ingredient being $M_{x2}Al_{y2}$ is protected by the inert element M and thus difficult to react with the acid solution. The matrix phase with an average ingredient being $RE_{x1}Al_{y1}$ is active ingredient and very easy to react with the acid. The solidification structure of the initial alloy is helpful to subsequently obtaining an aluminum-containing alloy powder with an ingredient being $M_{x2}Al_{y2}$ by separation.

Furthermore, an atomic percent content of Al element in the matrix phase with an average ingredient being $RE_{x1}Al_{y1}$ is higher than an atomic percent content in the dispersed particle phase with an ingredient being $M_{x2}Al_{y2}$, that is, y1>y2.

Furthermore, a particle shape of the dispersed particle phase is not limited and may include at least one of dendritic shape, spheroidal shape, sub-spheroidal shape, square shape, pie shape and rod shape. When the particle shape is a rod shape, the particle size specifically refers to a diameter size of a cross section of the rod shape.

Furthermore, a particle size of the dispersed particle phase is in a range of 2 nm to 50 mm.

Furthermore, an acid in the acid solution includes at least one of sulfuric acid, hydrochloric acid, nitric acid, perchloric acid, phosphoric acid, acetic acid, oxalic acid, formic acid and carbonic acid, and a molar concentration of the acid is in a range of 0.001 mol/L to 20 mol/L.

Furthermore, a solvent in the acid solution includes water.

Furthermore, the temperature of the reaction between the matrix phase and the acid solution may be in a range of 0° C. to 100° C., and the time of the reaction may be in a range of 0.1 min to 24 h.

Furthermore, after the step of the reaction between the matrix phase and the acid solution, the method further includes: respectively performing plasma spheroidization for a separated pre-prepared powder after screening to obtain a spheroidal aluminum-containing alloy powders of different particle sizes; or, performing plasma spheroidization and screening for the separated pre-prepared powder to obtain a spheroidal aluminum-containing alloy powders of different particle sizes.

Furthermore, the present disclosure further provides an application of the aluminum-containing alloy powder obtained by the above preparation method in photo-electronic devices, absorbing materials, catalysts, 3D metal printing, metal injection molding and corrosion-resistant coating.

Furthermore, in the application of the aluminum-containing alloy powder obtained by the above preparation method in the 3D metal printing, the particle size of the aluminum-containing alloy powder is 0.5 μm to 1 mm.

Furthermore, in the application of the aluminum-containing alloy powder obtained by the above preparation method in the metal injection molding, the particle size of the aluminum-containing alloy powder is 0.1 μm to 50 μm.

Furthermore, in the application of the aluminum-containing alloy powder obtained by the above preparation method in the corrosion-resistant coating, the particle size of the aluminum-containing alloy powder is 2 nm to 50 μm.

The method of preparing an aluminum-containing alloy powder according to the present disclosure has the following advantages.

Firstly, an initial alloy with an ingredient being $RE_aAl_bM_c$ is prepared by selecting a metal M, a metal Al and rare earth RE of specific classes and contents. The solidification structure of the initial alloy is formed by a dispersed particle phase with an ingredient being $M_{x2}Al_{y2}$ and a matrix phase with an average ingredient being $RE_{x1}Al_{y1}$, which aids in separating the dispersed particle phase through reaction between the initial alloy and an acid solution. Specifically, when the initial alloy reacts with the acid solution, hydrogen ions in the acid solution react with the rare earth element and the Al element in the matrix phase to dissolve the rare earth element and the Al element into ions entering the solution, and a small amount of Al subjected to solution treatment in the dispersed particle phase with an ingredient being $M_{x2}Al_{y2}$ is protected by the inert element M and thus difficult to react with the acid solution. Therefore, after the matrix phase with an average ingredient being $RE_{x1}Al_{y1}$ is removed by reacting with the acid solution, the dispersed particle phase with an ingredient being $M_{x2}Al_{y2}$ is separated out by dispersion to obtain an aluminum-containing alloy powder with an ingredient being $M_{x2}Al_{y2}$. The particle size of the aluminum-containing alloy powder may be nano-level, sub-micron-level, micron-level and even millimeter-level.

Secondly, since a large amount of rare earth element exists in the alloy melt obtained by melting the raw materials in the present disclosure, even if oxygen element enters the alloy melt, all of the oxygen elements will be absorbed quickly by the rare earth element so as to form a dense oxidized rare earth protection film covering a surface of the alloy melt, thus preventing the oxygen element from further entering the channel of the alloy melt. Therefore, in the sub-step (2) of the present disclosure, the raw materials can be melted under a low vacuum condition or even under an atmospheric environment condition. Furthermore, the rare earth element in the alloy melt has good absorption not only for oxygen element but also for other various impurity elements in the raw materials M and Al. Therefore, the dispersed particle phase in the initial alloy obtained by solidification in sub-step (3) will not be contaminated by the oxygen element and has a lower impurity element content than the raw materials M and Al. Therefore, these impurity elements may enter the matrix phase with an average ingredient being $RE_{x1}Al_{y1}$ and are removed along with the reaction between the matrix phase with an average ingredient being $RE_{x1}Al_{y1}$ and the acid, such that the aluminum-containing alloy powder with an ingredient being $M_{x2}Al_{y2}$ has a lower impurity content than the raw materials M and Al.

Therefore, the preparation method features simple process, easy operation and low cost and can prepare different morphologies of aluminum-containing alloy powders of nano-level, sub-micron-level, micron-level and millimeter-level. The aluminum-containing alloy powder has good application prospect in the fields such as photo-electronic devices, absorbing materials, catalysts, 3D metal printing, metal injection molding and corrosion-resistant coating.

BRIEF DESCRIPTIONS OF THE DRAWINGS

DETAILED DESCRIPTIONS OF EMBODIMENTS

Figure 1:
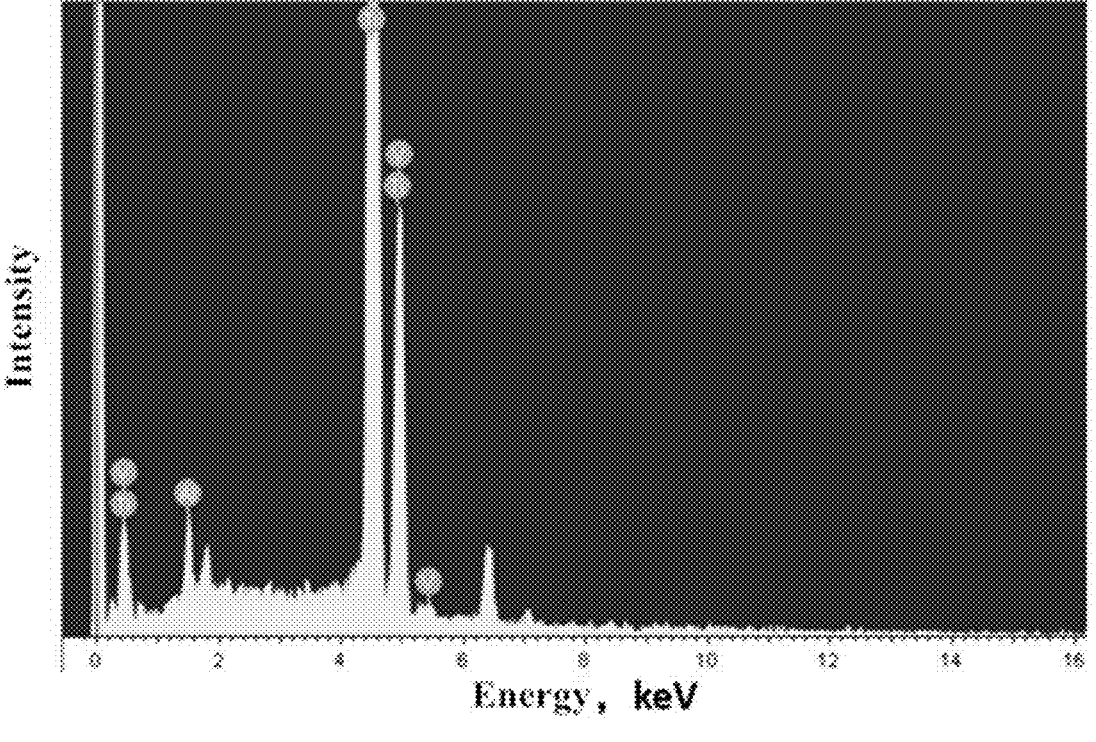
FIG. 1 is an energy spectrum diagram illustrating a Ti—V—Al powder according to a fifth example of the present disclosure.

A method of preparing an aluminum-containing alloy powder and an application thereof according the present disclosure will be further described below in combination with the accompanying drawings.

Example 1

The example provides a method of preparing a micron-level Ti—V—Cr—Mo—Zr—Al alloy powder. The preparation method includes the following steps.

(1) Raw materials were weighed according to the formulation of $Gd_{76}Al_8(Ti_{82}V_8Cr_6Mo_2Zr_2)_{16}$ alloy (atomic percent), and then subjected to arc melting to obtain a $Gd_{76}Al_8(Ti_{82}V_8Cr_6Mo_2Zr_2)_{16}$ master alloy. The master alloy was reheated and melted into an alloy melt by induction melting, and the alloy melt was prepared into a $Gd_{76}Al_8(Ti_{82}V_8Cr_6Mo_2Zr_2)_{16}$ alloy sheet with a thickness of 1 mm to 20 mm at the solidification rate of 10 K/s to 1000 K/s. The solidification structure of the alloy sheet was formed by a matrix phase with an average ingredient about being $Gd_{91.5}Al_{8.5}$ and a dispersed dendritic particle phase with an ingredient being $(Ti_{82}V_8Cr_6Mo_2Zr_2)_{94.5}Al_{5.5}$, and the particle size of the dispersed particle phase was in a range of 1 μm to 200 μm.

(2) At room temperature, 1 g of $Gd_{76}Al_8(Ti_{82}V_8Cr_6Mo_2Zr_2)_{16}$ alloy sheet prepared at step (1) was added to 150 ml of sulfuric acid aqueous solution with a concentration of 0.25 mol/L for reaction. During the reaction, the matrix phase with an average ingredient about being $Gd_{91.5}Al_{8.5}$ reacted with an acid to change into an ion entering the solution, whereas the micron-level $(Ti_{82}V_8Cr_6Mo_2Zr_2)_{94.5}Al_{5.5}$ dispersed dendritic particle phase difficult to react with the acid was gradually separated from the matrix phase in a dispersion manner. After 20 min, the obtained $(Ti_{82}V_8Cr_6Mo_2Zr_2)_{94.5}Al_{5.5}$ micron-level particles were separated from the solution, and cleaned and dried to obtain a micron-level $(Ti_{82}V_8Cr_6Mo_2Zr_2)_{94.5}Al_{5.5}$ alloy powder, with an average size of a single $(Ti_{82}V_8Cr_6Mo_2Zr_2)_{94.5}Al_{5.5}$ particle being in a range of 1 μm to 200 μm.

Example 2

This example provides a method of preparing a micron-level Ti—Mo—Zr—Al alloy powder. The preparation method includes the following steps.

(1) Raw materials were weighed according to the formulation of $Ce_{76}Al_8(Ti_{98}Mo_1Zr_1)_{16}$ alloy (atomic percent), and then subjected to arc melting to obtain a $Ce_{76}Al_8(Ti_{98}Mo_1Zr_1)_{16}$ master alloy. The master alloy was reheated and melted into an alloy melt by induction melting, and the alloy melt was prepared into a $Ce_{76}Al_8(Ti_{98}Mo_1Zr_1)_{16}$ alloy sheet with a thickness of 1 mm to 20 mm at the solidification rate of 10 K/s to 1000 K/s. The solidification structure of the alloy sheet was formed by a matrix phase with an average ingredient about being $Ce_{91.5}Al_{8.5}$ and a dispersed dendritic particle phase with an ingredient being $(Ti_{98}Mo_1Zr_1)_{94.5}Al_{5.5}$, and the particle size of the dispersed particle phase was in a range of 1 μm to 200 μm.

(2) At room temperature, 1 g of $Ce_{76}Al_8(Ti_{98}Mo_1Zr_1)_{16}$ alloy sheet prepared at step (1) was added to 200 ml of hydrochloric acid aqueous solution with a concentration of 0.4 mol/L for reaction. During the reaction, the matrix phase with an average ingredient of about $Ce_{91.5}Al_{8.5}$ reacted with an acid to change into an ion entering the solution, whereas the micron-level $(Ti_{98}Mo_1Zr_1)_{94.5}Al_{5.5}$ dispersed dendritic particle phase difficult to react with the acid was gradually separated from the matrix phase in a dispersion manner. After 20 min, the obtained $(Ti_{98}Mo_1Zr_1)_{94.5}Al_{5.5}$ micron-level particles were separated from the solution, and cleaned and dried to obtain a micron-level $(Ti_{98}Mo_1Zr_1)_{94.5}Al_{5.5}$ alloy powder, with an average size of a single $(Ti_{98}Mo_1Zr_1)_{94.5}Al_{5.5}$ particle being in a range of 1 μm to 200 μm.

Example 3

This example provides a method of preparing a nano-level Ti—Cr—Al alloy powder. The preparation method includes the following steps.

(1) Raw materials were weighed according to the formulation of $Ce_{72}Al_{12}(Ti_{97.5}Cr_{2.5})_{16}$ alloy (atomic percent), and then subjected to induction melting to obtain a molten $Ce_{72}Al_{12}(Ti_{97.5}Cr_{2.5})_{16}$ alloy melt. The alloy melt was prepared into a $Ce_{72}Al_{12}(Ti_{97.5}Cr_{2.5})_{16}$ alloy ribbon with a thickness of 20 μm to 100 μm by using copper roller spinning at the rate of $\sim 10^5$ K/s. The solidification structure of the alloy ribbon was formed by a matrix phase with an average ingredient about being $Ce_{87}Al_{13}$ and a dispersed particle phase with an ingredient being $(Ti_{97.5}Cr_{2.5})_{91.5}Al_{8.5}$, and the dispersed particle phase had a particle size of 10 to 200 nm and was shaped like sub-spheroid.

(2) At room temperature, 1 g of $Ce_{72}Al_{12}(Ti_{97.5}Cr_{2.5})_{16}$ alloy ribbon prepared at step (1) was added to 150 ml of hydrochloric acid aqueous solution with a concentration of 0.4 mol/L for reaction. During the reaction, the matrix phase with an average ingredient about being $Ce_{87}Al_{13}$ reacted with an acid to change into an ion entering the solution, whereas the nano-level $(Ti_{97.5}Cr_{2.5})_{91.5}Al_{8.5}$ dispersed particle phase difficult to react with the acid was gradually separated from the matrix phase in a dispersion manner. After 10 min, the obtained $(Ti_{97.5}Cr_{2.5})_{91.5}Al_{8.5}$ nano-level particles were separated from the solution, and cleaned and dried to obtain a nano-level $(Ti_{97.5}Cr_{2.5})_{91.5}Al_{8.5}$ alloy powder, with an average size of a single $(Ti_{97.5}Cr_{2.5})_{91.5}Al_{8.5}$ particle being in a range of 10 nm~200 nm.

Example 4

This example provides a method of preparing a micron-level Ti—Nb—Al alloy powder. The preparation method includes the following steps.

(1) Raw materials were weighed according to the formulation of $Ce_{68}Al_{14}(Ti_{96}Nb_4)_{18}$ alloy (atomic percent), and then subjected to induction melting to obtain a molten $Ce_{68}Al_{14}(Ti_{96}Nb_4)_{18}$ alloy melt. The alloy melt was prepared into a $Ce_{68}Al_{14}(Ti_{96}Nb_4)_{18}$ alloy sheet with a thickness of 1 mm to 20 mm at the solidification rate of 10 K/s to 1000 K/s. The solidification structure of the alloy sheet was formed by a matrix phase with an average ingredient about being $Ce_{85}Al_{15}$ and a dispersed dendritic particle phase with an ingredient being $(Ti_{96}Cr_4)_{90}Al_{10}$, and the particle size of the dispersed particle phase was 1 μm to 200 μm.

(2) At room temperature, 1 g of $Ce_{68}Al_{14}(Ti_{96}Nb_4)_{18}$ alloy sheet prepared at step (1) was added to 200 ml of hydrochloric acid aqueous solution with a concentration of 0.5 mol/L for reaction. During the reaction, the matrix phase with an average ingredient being $Ce_{85}Al_{15}$ reacted with an acid to change into an ion entering the solution, whereas the micron-level $(Ti_{96}Nb_4)_{90}Al_{10}$ dispersed dendritic particle phase difficult to react with the acid was gradually separated from the matrix phase in a dispersion manner. After 20 min, the obtained $(Ti_{96}Nb_4)_{90}Al_{10}$ micron-level dendritic particles were separated from the solution, and cleaned and dried to obtain a micron-level $(Ti_{96}Nb_4)_{90}Al_{10}$ alloy powder, with an average size of a single $(Ti_{96}Nb_4)_{90}Al_{10}$ particle being in a range of 1 μm to 200 μm.

Example 5

This example provides a method of preparing a nano-level Ti—V—Al alloy powder. The preparation method includes the following steps.

(1) Raw materials were weighed according to the formulation of $Ce_{72}Al_{10}(Ti_{96}V_4)_{18}$ alloy (atomic percent), and then subjected to induction melting to obtain a molten $Ce_{72}Al_{10}(Ti_{96}V_4)_{18}$ alloy melt. The alloy melt was prepared into a $Ce_{72}Al_{10}(Ti_{96}V_4)_{18}$ alloy ribbon with a thickness of 20 μm to 100 μm by using copper roller spinning at the rate of $\sim 10^5$ K/s. The solidification structure of the alloy ribbon was formed by a matrix phase with an average ingredient being $Ce_{88.5}Al_{11.5}$ and a dispersed particle phase with an ingredient being $(Ti_{96}V_4)_{92.5}Al_{7.5}$, and the dispersed particle phase had a particle size of 10 nm to 300 nm and was shaped like sub-spheroid.

(2) At room temperature, 1 g of $Ce_{72}Al_{10}(Ti_{96}V_4)_{18}$ alloy ribbon prepared at step (1) was added to 200 ml of hydrochloric acid aqueous solution with a concentration of 0.5 mol/L for reaction. During the reaction, the matrix phase with an average ingredient being $Ce_{88.5}Al_{11.5}$ reacted with an acid to change into an ion entering the solution, whereas the nano-level $(Ti_{96}V_4)_{92.5}Al_{7.5}$ dispersed particle phase difficult to react with the acid was gradually separated from the matrix phase in a dispersion manner. After 10 min, the obtained $(Ti_{96}V_4)_{92.5}Al_{7.5}$ nano-level particles were separated from the solution, and cleaned and dried to obtain a nano-level $(Ti_{96}V_4)_{92.5}Al_{7.5}$ alloy powder, with an average size of a single $(Ti_{96}V_4)_{92.5}Al_{7.5}$ particle being in a range of 10 nm to 300 nm. As shown in FIG. 1, it is verified that the alloy powder is formed of Ti, V and Al elements.

Example 6

This example provides a method of preparing a nano-level Ti—V—Al alloy powder. The preparation method includes the following steps:

(1) Raw materials were weighed according to the formulation of $Ce_{68}Al_{14}(Ti_{96}V_4)_{18}$ alloy (atomic percent), and then subjected to induction melting to obtain a molten $Ce_{68}Al_{14}(Ti_{96}V_4)_{18}$ alloy melt. The alloy melt was prepared into a $Ce_{68}Al_{14}(Ti_{96}V_4)_{18}$ alloy ribbon with a thickness of 20 μm to 100 μm by using copper roller spinning at the rate of $\sim 10^5$ K/s. The solidification structure of the alloy ribbon was formed by a matrix phase with an average ingredient being $Ce_{85}Al_{15}$ and a dispersed particle phase with an ingredient being $(Ti_{96}V_4)_{90}Al_{10}$, and the dispersed particle phase had a particle size of 10 nm to 300 nm and was shaped like sub-spheroid.

Figure 2:
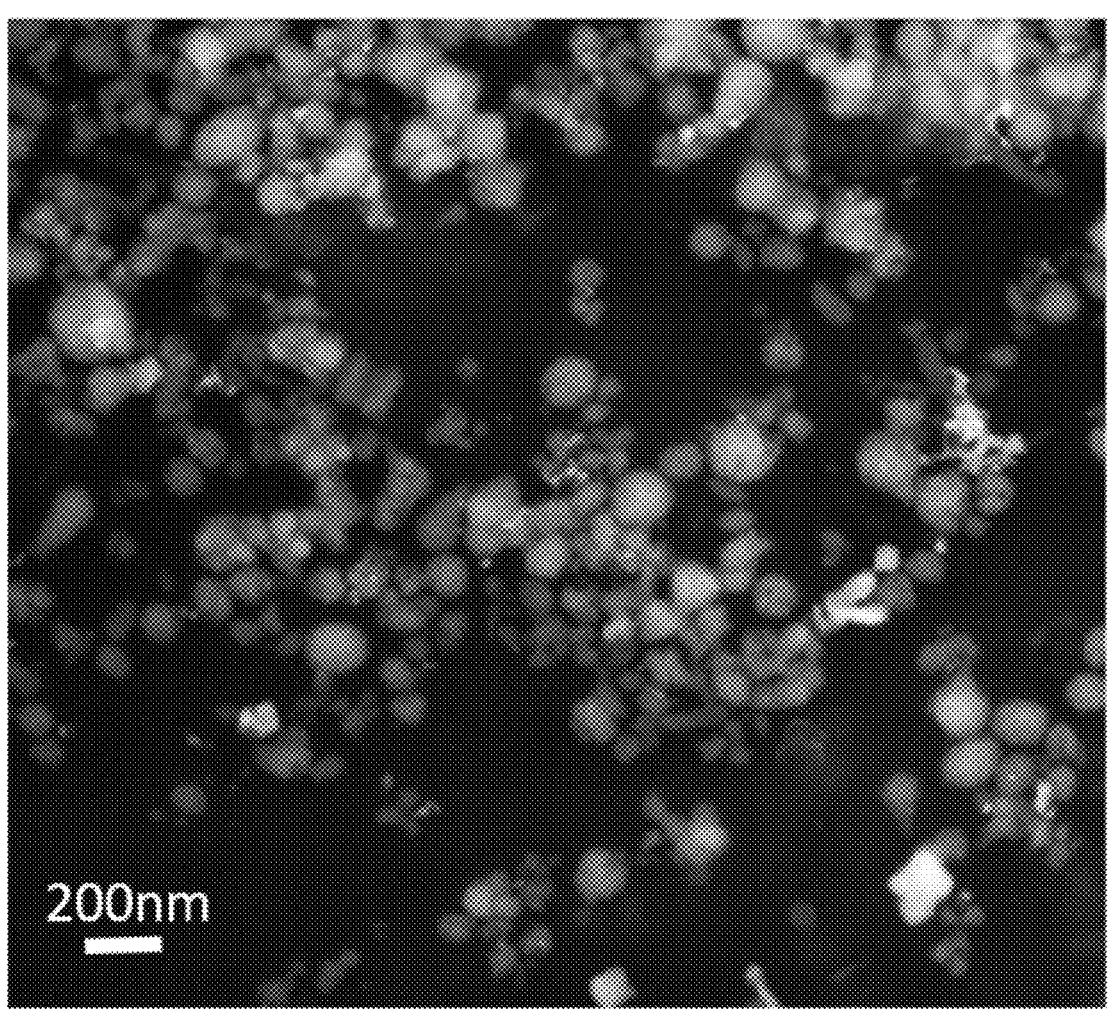
FIG. 2 is a scanning electron micrograph illustrating a Ti—V—Al powder according to a sixth example of the present disclosure.

(2) At room temperature, 1 g $Ce_{68}Al_{14}(Ti_{96}Nb_4)_{18}$ alloy ribbon prepared at step (1) was added to 200 ml of hydrochloric acid aqueous solution with a concentration of 0.5 mol/L for reaction. During the reaction, the matrix phase with an average ingredient being $Ce_{85}Al_{15}$ reacted with an acid to change into an ion entering the solution, whereas the nano-level $(Ti_{96}V_4)_{90}Al_{10}$ dispersed particle phase difficult to react with the acid was gradually separated from the matrix phase in a dispersion manner. After 10 min, the obtained $(Ti_{96}V_4)_{90}Al_{10}$ nano-level particles were separated from the solution, and cleaned and dried to obtain a nano-level $(Ti_{96}V_4)_{90}Al_{10}$ alloy powder shown in FIG. 2, with an average size of a single $(Ti_{96}V_4)_{90}Al_{10}$ particle being in a range of 10 nm to 300 nm. The nano-level $(Ti_{96}V_4)_{90}Al_{10}$ alloy powder may be applied to the field of titanium alloy corrosion-resistant coating additive.

Example 7

This example provides a method of preparing a sub-micron-level Ti—V—Al alloy powder. The preparation method includes the following steps.

(1) Raw materials were weighed according to the formulation of $(La_{50}Ce_{50})_{68}Al_{14}(Ti_{96}V_4)_{18}$ alloy (atomic percent), and then subjected to induction melting to obtain a molten $(La_{50}Ce_{50})_{68}Al_{14}(Ti_{96}V_4)_{18}$ alloy melt. The alloy melt was prepared into a $(La_{50}Ce_{50})_{68}$ $(Ti_{96}V_4)_{18}$ alloy ribbon with a thickness of 100 µm to 2 mm by using copper roller spinning at the solidification rate of about $10^3$ to $10^4$ K/s. The solidification structure of the alloy ribbon was formed by a matrix phase with an average ingredient being $(La_{50}Ce_{50})_{85}Al_{15}$ and a dispersed particle phase with an ingredient being $(Ti_{96}V_4)_{90}Al_{10}$, and the dispersed particle phase had a particle size of 100 nm to 1.5 µm.

Figure 3:
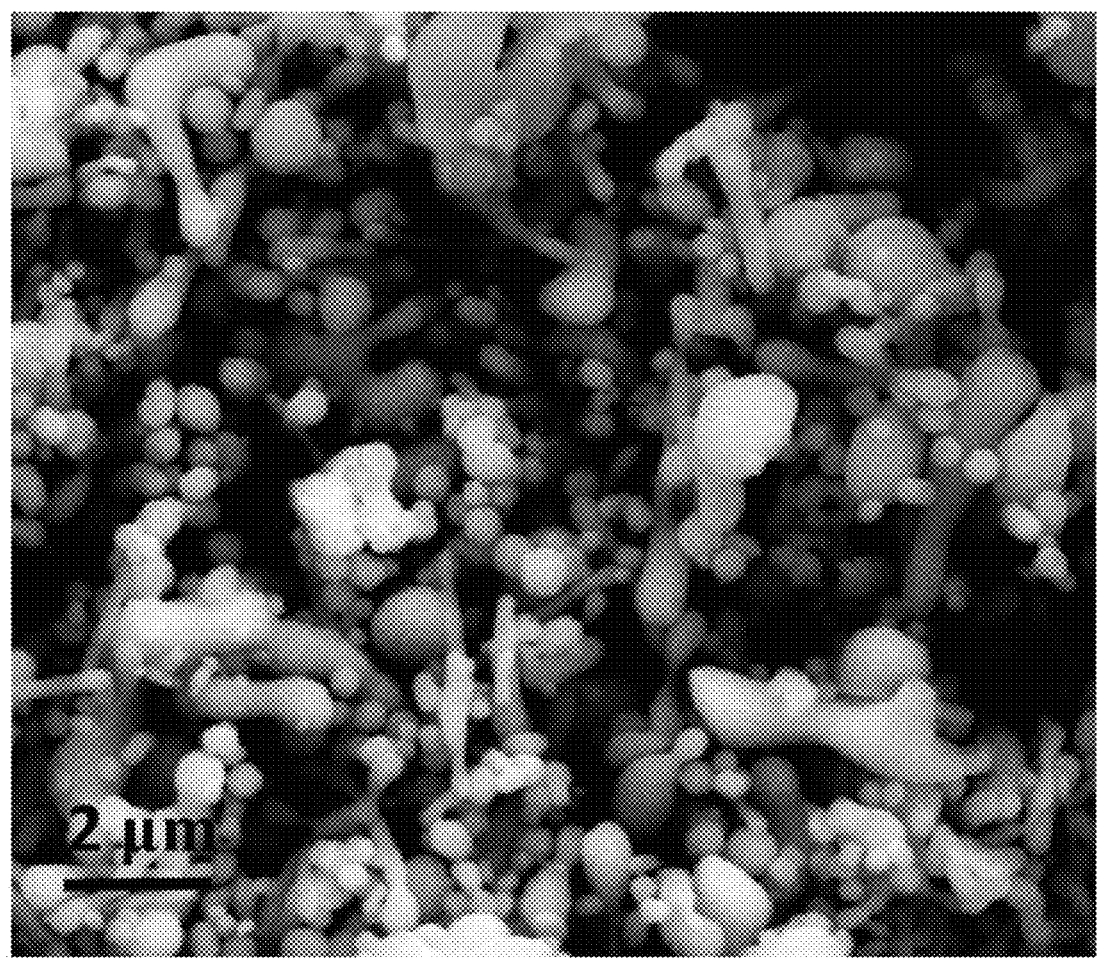
FIG. 3 is a scanning electron micrograph illustrating a Ti—V—Al powder according to a seventh example of the present disclosure.

(2) At room temperature, 1 g of $(La_{50}Ce_{50})_{68}Al_{14}(Ti_{96}V_4)_{18}$ alloy ribbon prepared at step (1) was added to 200 ml of sulfuric acid aqueous solution with a concentration of 0.4 mol/L for reaction. During the reaction, the matrix phase with an average ingredient being $(La_{50}Ce_{50})_{85}Al_{15}$ reacted with an acid to change into an ion entering the solution, whereas the sub-micron-level $(Ti_{96}V_4)_{90}Al_{10}$ dispersed particle phase difficult to react with the acid was gradually separated from the matrix phase in a dispersion manner. After 10 min, the obtained $(Ti_{96}V_4)_{90}Al_{10}$ sub-micron-level particles were separated from the solution, and cleaned and dried to obtain a sub-micron-level $(Ti_{96}V_4)_{90}Al_{10}$ alloy powder shown in FIG. 3, with an average size of a single $(Ti_{96}V_4)_{90}Al_{10}$ particle being in a range of 100 nm to 1.5 µm.

Example 8

This example provides a method of preparing a micron-level Ti—V—Al alloy powder. The preparation method includes the following steps.

(1) Raw materials were weighed according to the formulation of $Ce_{68}Al_{14}(Ti_{96}V_4)_{18}$ alloy (atomic percent), and then subjected to induction melting to obtain a molten $Ce_{68}Al_{14}(Ti_{96}V_4)_{18}$ alloy melt. The alloy melt was prepared into a $Ce_{68}Al_{14}(Ti_{96}V_4)_{18}$ alloy sheet with a thickness of 2 mm to 6 mm at the solidification rate of 50 K/s to 500 K/s. The solidification structure of the alloy sheet was formed by a matrix phase with an average ingredient being $Ce_{85}Al_{15}$ and a dispersed dendritic particle phase with an ingredient being $(Ti_{96}V_4)_{90}Al_{10}$, and the particle size of the dispersed particle phase was 5 µm to 100 µm.

Figure 4:
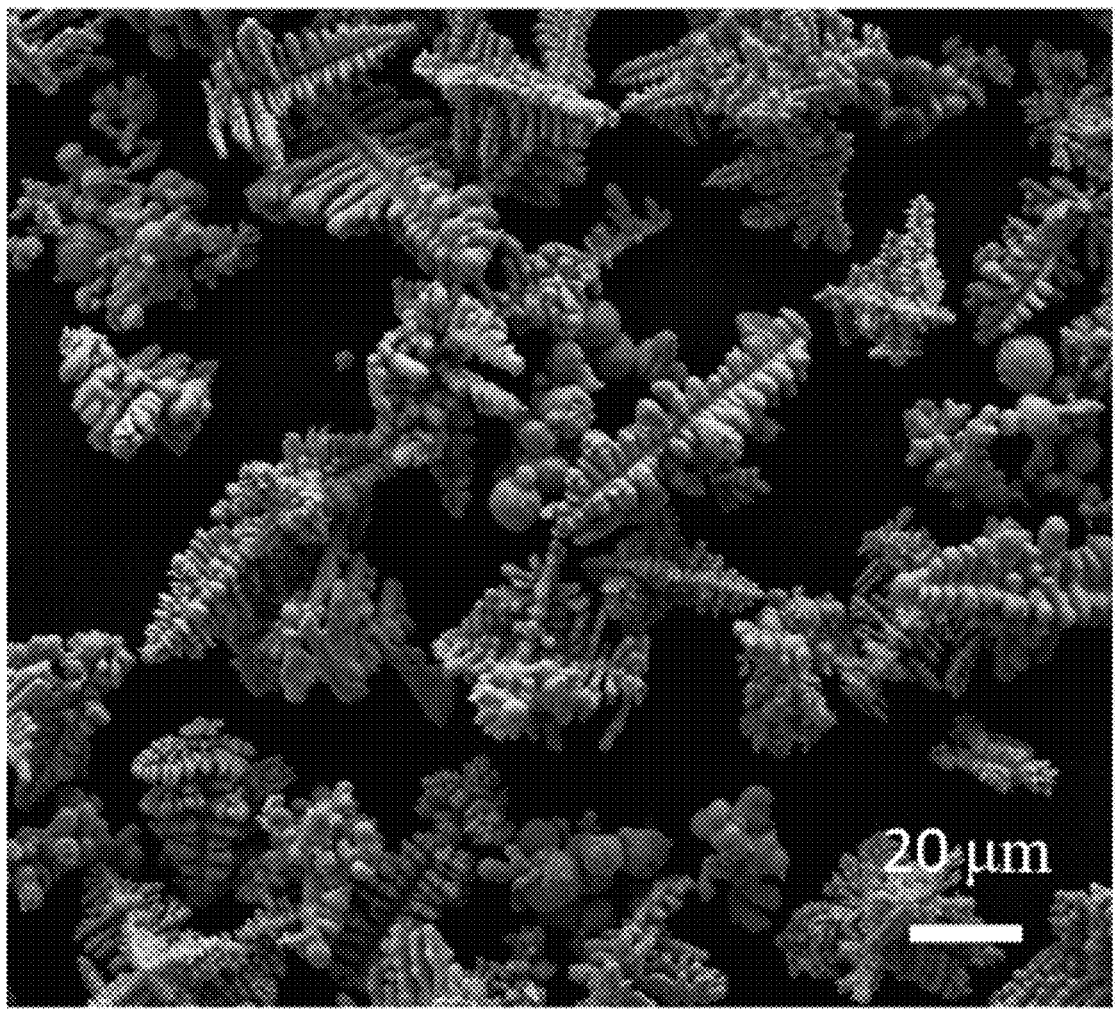
FIG. 4 is a scanning electron micrograph illustrating a Ti—V—Al powder according to an eighth example of the present disclosure.
Figure 5:
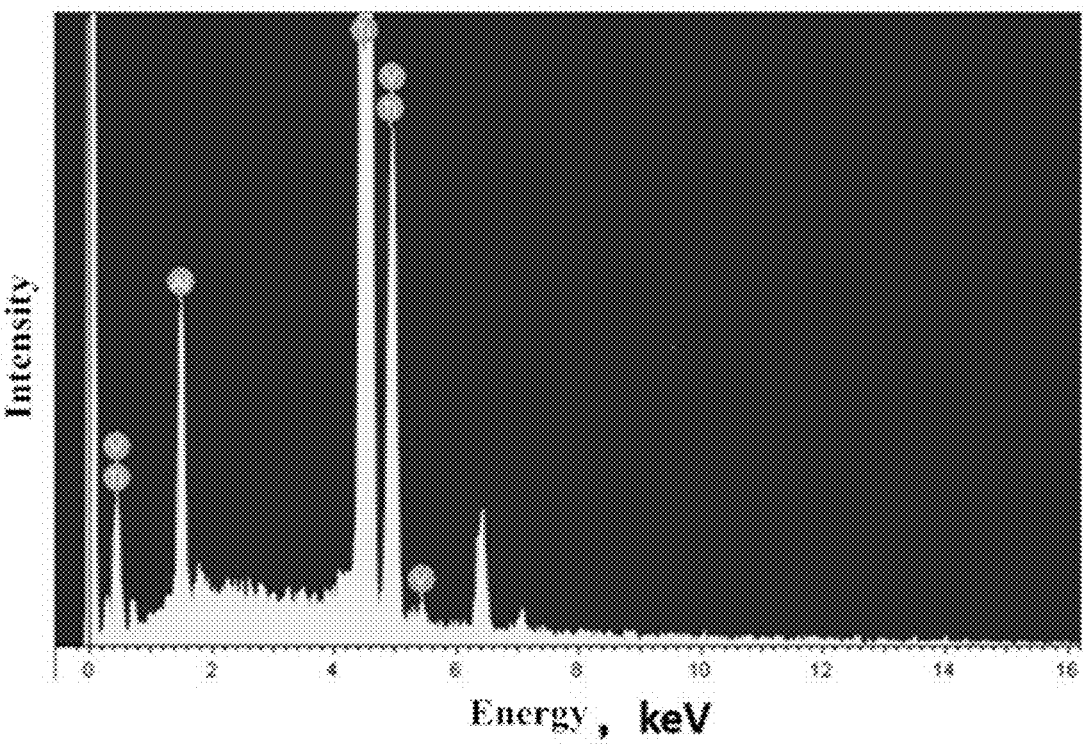
FIG. 5 is an energy spectrum diagram illustrating a Ti—V—Al powder according to an eighth example of the present disclosure.

(2) At room temperature, 1 g of $Ce_{68}Al_{14}(Ti_{96}V_4)_{18}$ alloy sheet prepared at step (1) was added to 200 ml of hydrochloric acid aqueous solution with a concentration of 0.5 mol/L for reaction. During the reaction, the matrix phase with an average ingredient being $Ce_{85}Al_{15}$ reacted with an acid to change into an ion entering the solution, whereas the micron-level $(Ti_{96}V_4)_{90}Al_{10}$ dispersed dendritic particle phase difficult to react with the acid was gradually separated from the matrix phase in a dispersion manner. After 20 min, the obtained $(Ti_{96}V_4)_{90}Al_{10}$ micron-level dendritic particles were separated from the solution, and cleaned and dried to obtain a micron-level $(Ti_{96}V_4)_{90}Al_{10}$ alloy powder as shown in FIG. 4, with an average size of a single $(Ti_{96}V_4)_{90}Al_{10}$ particle being in a range of 5 µm to 100 µm. As shown in FIG. 5, it is verified that the alloy powder is formed of Ti, V and Al elements.

Example 9

This example provides a method of preparing a spheroidal micron-level Ti—V—Al alloy powder. The preparation method includes the following steps.

(1) Raw materials were weighed according to the formulation of $Ce_{68}Al_{14}(Ti_{96}V_4)_{18}$ alloy (atomic percent), and then subjected to induction melting to obtain a molten $Ce_{68}Al_{14}(Ti_{96}V_4)_{18}$ alloy melt. The alloy melt was prepared into a $Ce_{68}Al_{14}(Ti_{96}V_4)_{18}$ alloy sheet with a thickness of 1 mm to 20 mm at the solidification rate of 10 K/s to 1000 K/s. The solidification structure of the alloy sheet was formed by a matrix phase with an average ingredient being $Ce_{85}Al_{15}$ and a dispersed dendritic particle phase with an ingredient being $(Ti_{96}V_4)_{90}Al_{10}$, and the particle size of the dispersed particle phase was 1 µm to 200 µm.

(2) At room temperature, 1 g of $Ce_{68}Al_{14}(Ti_{96}V_4)_{18}$ alloy sheet prepared at step (1) was added to 200 ml of hydrochloric acid aqueous solution with a concentration of 0.5 mol/L for reaction. During the reaction, the matrix phase with an average ingredient being $Ce_{85}Al_{15}$ reacted with an acid to change into an ion entering the solution, whereas the micron-level $(Ti_{96}V_4)_{90}Al_{10}$ dispersed dendritic particle phase difficult to react with the acid was gradually separated from the matrix phase in a dispersion manner. After 20 min, the obtained $(Ti_{96}V_4)_{90}Al_{10}$ micron-level particles were separated from the solution, and cleaned and dried to obtain a micron-level $(Ti_{96}V_4)_{90}Al_{10}$ alloy powder, with an average size of a single $(Ti_{96}V_4)_{90}Al_{10}$ particle being in a range of 1 µm to 200 µm.

(3) 0.5 kg of micron-level $(Ti_{96}V_4)_{90}Al_{10}$ alloy powder prepared at step (2) was collected and then screened through 100 meshes, 270 meshes, 1000 meshes, 2000 meshes and 8000 meshes to obtain graded $(Ti_{96}V_4)_{90}Al_{10}$ alloy powders with a range of a dendritic particle size being >150 µm, 150 µm to 53 µm, 53 µm to 13 µm, 13 µm to 6.5 µm, 6.5 µm to 1.6 µm and less than 1.6 µm respectively. The $(Ti_{96}V_4)_{90}Al_{10}$ alloy powders with a range of a dendritic particle size being 150 µm to 53 µm, 53 µm to 13 µm and 13 µm to 6.5 µm respectively were selected to further prepare spheroidal $(Ti_{96}V_4)_{90}Al_{10}$ alloy powders with a range of a particle size being 150 µm to 53 µm, 53 µm to 13 µm and 13 µm to 6.5 µm by using a mature plasma spheroidization technique. The spheroidal $(Ti_{96}V_4)_{90}Al_{10}$ alloy powder may be applied to the fields of 3D metal printing and metal injection molding (MIM).

Example 10

The example provides a method of preparing a high purity nano-level Ti—V—Al alloy powder by using low purity raw materials. The preparation method includes the following steps.

Sponge Ti, Electrolyte V, rare earth Ce and Al raw materials with atomic percent contents of T impurity element (including at least one of O, H, N, P, S, F and Cl) being 3 at. %, 1 at. %, 2.5 at. % and 0.2 at. % were selected. The initial alloy raw materials were melted fully based on a given proportioning ratio to obtain an initial alloy melt with a content of major atomic percent content being $Ce_{70.5}Al_{10}$ $(Ti_{96}V_4)_{17}T_{2.5}$.

The initial alloy melt was prepared into a $Ce_{70.5}Al_{10}$ $(Ti_{96}V_4)_{17}T_{2.5}$ alloy ribbon with a thickness of ~20 µm at the solidification rate of ~$10^6$ K/s by using copper roller spinning. The solidification structure of the alloy ribbon was formed by a matrix phase with an average ingredient being $Ce_{86.5}Al_{10.5}T_3$ and a dispersed particle phase with an ingredient mainly being $(Ti_{96}V_4)_{92.25}Al_{7.5}T_{0.25}$. The volume percent of the dispersed particle phase in the alloy ribbon was about 12%, and the dispersed particle phase had a particle size of 5 nm to 100 nm and was shaped like sub-spheroid.

The alloy ribbon was an alloy ribbon formed by an endogenous aluminum-containing alloy powder and a wrapping body.

At room temperature, the prepared $Ce_{70.5}Al_{10}$ $(Ti_{96}V_4)_{17}T_{2.5}$ alloy ribbon was reacted with a hydrochloric acid aqueous solution with a concentration of 0.5 mol/L.

During the reaction, the matrix phase with an average ingredient mainly being $Ce_{86.5}Al_{10.5}T_3$ reacted with an acid to change into an ion entering the solution, and the nano-level $(Ti_{96.4}V_4)_{92.25}Al_{7.5}T_{0.25}$ dispersed particle phase difficult to react with the acid was gradually separated from the matrix phase by dispersion. After 10 min, the dispersed $(Ti_{96.4}V_4)_{92.25}Al_{7.5}T_{0.25}$ nano-level particles were separated from the solution and then cleaned and dried under a protective atmosphere to obtain a nano-level $(Ti_{96.4}V_4)_{92.25}Al_{7.5}T_{0.25}$ alloy powder with a particle size being in a range of 5 nm to 100 nm, where the T impurity content was greatly decreased with respect to the sponge Ti raw material.

Under the protective atmosphere, the nano-level $(Ti_{96.4}V_4)_{92.25}Al_{7.5}T_{0.25}$ alloy powder was mixed with epoxy resin and other painting components to prepare a nano-level titanium alloy modified polymer corrosion-resistant painting.

Example 11

The example provides a method of preparing a high purity micron-level Ti—Nb—Al alloy powder by using low purity raw materials. The preparation method includes the following steps.

Sponge Ti, Nb sheet, rare earth Ce and Al raw materials with atomic percent contents of T impurity element (including at least one of O, H, N, P, S, F and Cl) being 3 at. %, 1 at. %, 2.5 at. % and 0.2 at. % were selected. The initial alloy raw materials were melted fully based on a given proportioning ratio to obtain an initial alloy melt with an ingredient of major atomic percent content being $Ce_{67.5}Al_{13}(Ti_{96}Nb_4)_{17}T_{2.5}$.

The initial alloy melt was prepared into a $Ce_{67.5}Al_{13}(Ti_{96}Nb_4)_{17}T_{2.5}$ alloy ribbon with a thickness of ~1 mm at the solidification rate of 300 K/s by using copper roller spinning. The solidification structure of the alloy ribbon was formed by a matrix phase with an average ingredient being $Ce_{83.2}Al_{13.7}T_{3.1}$ and a dispersed particle phase with an ingredient mainly being $(Ti_{96}Nb_4)_{89.95}Al_{10}T_{0.05}$. The volume percent of the dispersed particle phase in the alloy ribbon was about 13%, and the dispersed particle phase had a particle size of 0.5 μm to 150 μm and was shaped like dendrite.

At room temperature, the prepared $Ce_{67.5}Al_{13}(Ti_{96}Nb_4)_{17}T_{2.5}$ alloy ribbon was reacted with a hydrochloric acid aqueous solution with a concentration of 0.5 mol/L. During the reaction, the matrix phase with an average ingredient mainly being $Ce_{83.2}Al_{13.7}T_{3.1}$ reacted with an acid to change into an ion entering the solution, and the micron-level $(Ti_{96}Nb_4)_{89.95}Al_{10}T_{0.05}$ dispersed particle phase difficult to react with the acid was gradually separated from the matrix phase by dispersion. After 10 min, the dispersed $(Ti_{96}Nb_4)_{89.95}Al_{10}T_{0.05}$ particles were separated from the solution and then cleaned and dried under a protective atmosphere to obtain a micron-level $(Ti_{96}Nb_4)_{89.95}Al_{10}T_{0.05}$ alloy powder with a particle size being in a range of 0.5 μm to 150 μm, where the T impurity content was greatly decreased with respect to the sponge Ti raw material.

The $(Ti_{96}Nb_4)_{89.95}Al_{10}T_{0.05}$ alloy powder was screened through screens of 270 meshes, 1000 meshes, 2000 meshes and 8000 meshes to obtain graded $(Ti_{96}Nb_4)_{89.95}Al_{10}T_{0.05}$ alloy powders with a range of a dendritic particle size being 150 μm to 53 μm, 53 μm to 13 μm, 13 μm to 6.5 μm, 6.5 μm to 1.6 μm and less than 1.6 μm respectively. The $(Ti_{96}Nb_4)_{89.95}Al_{10}T_{0.05}$ alloy powders with a range of a dendritic particle size being 150 μm to 53 μm, 53 μm to 13

μm and 13 μm to 6.5 μm respectively were selected to further prepare sub-spheroidal Ti—Nb—Al alloy powders with a range of a particle size being 150 μm to 53 μm, 53 μm to 13 μm and 13 μm to 6.5 μm by using a plasma spheroidization technique. The spheroidal Ti—Nb—Al alloy powders may be applied to the fields of 3D metal printing and metal injection molding.

Example 12

The example provides a method of preparing a high purity nano-level Ti—Al alloy powder by using low purity raw materials. The preparation method includes the following steps. Sponge Ti, rare earth Ce and Al raw materials with atomic percent contents of T impurity element (including at least one of O, H, N, P, S, F and Cl) being 3 at. %, 2.5 at. %, and 0.2 at. % were selected. The sponge Ti further contained 0.5 at. % of Mn; the rare earth Ce further contained 0.7 at. % of Mg.

The initial alloy raw materials were melted fully based on a given proportioning ratio to obtain an initial alloy melt with an ingredient of major atomic percent content being $(Ce_{99.3}Mg_{0.7})_{70.5}Al_{10}(Ti_{99.5}Mn_{0.5})_{17}T_{2.5}$. The initial alloy melt was prepared into a $(Ce_{99.3}Mg_{0.7})_{70.5}Al_{10}(Ti_{99.5}Mn_{0.5})_{17}T_{2.5}$ alloy ribbon with a thickness of ~20 μm at the solidification rate of ~$10^6$ K/s by using copper roller spinning. The solidification structure of the alloy ribbon was formed by a matrix phase with an average ingredient mainly being $(Ce_{99.3}Mg_{0.7})_{86.5}Al_{10.5}T_3$ and a dispersed particle phase with an ingredient mainly being $(Ti_{99.5}Mn_{0.5})_{92.25}Al_{7.5}T_{0.25}$. The volume percent of the dispersed particle phase in the alloy ribbon was about 12%, and the dispersed particle phase had a particle size of 5 nm to 150 nm and was shaped like sub-spheroid. A ratio of a number of its mono-crystalline particles to a total number of dispersed particles was greater than 80%.

The alloy ribbon was an alloy ribbon formed by the endogenous aluminum-containing alloy powder and the wrapping body.

At room temperature, the prepared $(Ce_{99.3}Mg_{0.7})_{70.5}Al_{10}(Ti_{99.5}Mn_{0.5})_{17}T_{2.5}$ alloy ribbon was reacted with a hydrochloric acid aqueous solution with a concentration of 1 mol/L. During the reaction, the matrix phase with an average ingredient mainly being $(Ce_{99.3}Mg_{0.7})_{86.5}Al_{10.5}T_3$ reacted with an acid to change into an ion entering the solution, and the nano-level $(Ti_{99.5}Mn_{0.5})_{92.25}Al_{7.5}T_{0.25}$ dispersed particle phase difficult to react with the acid was gradually separated from the matrix phase by dispersion. After 10 min, the dispersed $(Ti_{99.5}Mn_{0.5})_{92.25}Al_{7.5}T_{0.25}$ particles were separated from the solution and then cleaned and dried under a protective atmosphere to obtain a nano-level $(Ti_{99.5}Mn_{0.5})_{92.25}Al_{7.5}T_{0.25}$ alloy powder with a particle size being in a range of 5 nm to 150 nm, where the T impurity content was greatly decreased with respect to the sponge Ti raw material. Furthermore, With introduction of Mn and Mg into the alloy melt, no intermetallic compound composed of Ce, Mg and Ti, Mn was generated in the initial alloy ribbon; and structural features of the matrix phase and the dispersed particle phase in the alloy ribbon were not affected and the law of the decreasing content of the impurity of the dispersed particle phase was also not affected.

Under the protective atmosphere, the nano-level $(Ti_{99.5}Mn_{0.5})_{92.25}Al_{7.5}T_{0.25}$ alloy powder was mixed with epoxy resin and other painting components to prepare a nano-level titanium alloy modified polymer corrosion-resistant painting.

Example 13

The example provides a method of preparing a high purity nano-level Ti—V—Al alloy powder by using low purity raw materials. The preparation method includes the following steps.

Sponge Ti, V raw material, rare earth Ce raw material and Al raw material with atomic percent contents of T impurity element (including at least one of O, H, N, P, S, F and Cl) being 1.5 at. %, 0.5 at. %, 1.5 at. % and 0.2 at. % were selected. The initial alloy raw materials were melted fully based on a given proportioning ratio to obtain an initial alloy melt with an ingredient of major atomic percent content being $Ce_{65.6}Al_{15}(Ti_{96}V_4)_{18}T_{1.4}$.

The initial alloy melt was prepared into a $Ce_{65.6}Al_{15}(Ti_{96}V_4)_{18}T_{1.4}$ initial alloy ribbon with a thickness of about 30 μm to 50 μm at the solidification rate of $10^6$ K/s-$10^7$ K/s by using copper roller spinning. The solidification structure of the alloy ribbon was formed by a matrix phase with an average ingredient about being $Ce_{81.5}Al_{16.5}T_2$ and a dispersed particle phase with an ingredient mainly being $(Ti_{96}V_4)_{89}Al_{10.8}T_{0.2}$. The dispersed particle phase had a particle size of 5 nm to 250 nm and was shaped like sub-spheroid. The volume percent of the dispersed particle phase in the alloy ribbon was about 12%.

The alloy ribbon was an alloy ribbon formed by the endogenous aluminum-containing alloy powder and the wrapping body. The $(Ti_{96}V_4)_{89}Al_{10.8}T_{0.2}$ dispersed particle phase was the endogenous aluminum-containing alloy powder and the $Ce_{81.5}Al_{16.5}T_2$ matrix phase was the wrapping body.

At room temperature, the prepared initial alloy ribbon with a major ingredient being $Ce_{65.6}Al_{15}(Ti_{96}V_4)_{18}T_{14}$ was reacted with a hydrochloric acid aqueous solution with a concentration of 0.5 mol/L. During the reaction, the matrix phase with an average ingredient mainly being $Ce_{81.5}Al_{16.5}T_2$ reacted with an acid to change into an ion entering the solution, and the nano-level $(Ti_{96}V_4)_{89}Al_{10.8}T_{0.2}$ dispersed particle phase difficult to react with the acid was gradually separated from the matrix phase by dispersion. The dispersed $(Ti_{96}V_4)_{89}Al_{10.8}T_{0.2}$ nano-particles were separated from the solution and then cleaned and dried under a protective atmosphere to obtain a nano-level $(Ti_{96}V_4)_{89}Al_{10.8}T_{0.2}$ alloy powder with a particle size being in a range of 5 nm to 250 nm, where the T impurity content was greatly decreased with respect to the Ti raw material.

Under the protective atmosphere, the nano-level $(Ti_{96}V_4)_{89}Al_{10.8}T_{0.2}$ alloy powder was mixed with epoxy resin and other painting components to prepare a nano-level titanium alloy modified polymer corrosion-resistant painting.

Example 14

The example provides a method of preparing a high purity sub-micron-level Fe—Cr—Al alloy powder by using low purity raw materials. The preparation method includes the following steps:

Fe sheet, Cr sheet, rare earth La and Al raw materials with atomic percent contents of T impurity element (including at least one of O, H, N, P, S, F and Cl) being 0.75 at. %, 0.5 at. %, 2 at. % and 0.2 at. % were selected. The initial alloy raw materials were melted fully based on a given proportioning ratio to obtain an initial alloy melt with an ingredient of major atomic percent content being $La_{46.5}Fe_{27}Cr_7Al_{18}T_{1.5}$.

The initial alloy melt was prepared into a $La_{46.5}Fe_{27}Cr_7Al_{18}T_{1.5}$ initial alloy thin ribbon with a thickness of about 100 μm at the solidification rate of about $10^5$ K/s by using copper roller spinning. The solidification structure of the alloy thin ribbon was formed by a dispersed particle phase with a major ingredient being $Fe_{73.3}Cr_{20}Al_{6.5}T_{0.2}$ and a matrix phase with a major ingredient being $La_{74}Al_{24}T_2$. The dispersed particle phase had a particle size of 5 nm to 3 μm and was mainly of sub-micron-level.

The alloy ribbon was an alloy ribbon formed by the endogenous aluminum-containing alloy powder and the wrapping body. The $Fe_{73.3}Cr_{20}Al_{6.5}T_{0.2}$ dispersed particle phase was the endogenous aluminum-containing alloy powder and the $La_{74}Al_{24}T_2$ matrix phase was the wrapping body. By using 0.5 mol/L dilute hydrochloric acid, the $La_{74}Al_{24}T_2$ matrix phase in the $La_{46.5}Fe_{27}Cr_7Al_{18}T_{1.5}$ initial alloy thin ribbon was removed through reaction corrosion to obtain a dispersed aluminum-containing alloy powder material with a major ingredient being $Fe_{73.3}Cr_{20}Al_{6.5}T_2$, with a particle size being in a range of 5 nm to 3 μm, where the T impurity content was greatly decreased with respect to the Fe raw material.

The technical features of the above examples may be combined arbitrarily. For clarity of descriptions, all of the possible combinations of the technical features of the above examples are not described. However, as long as the combinations of these technical features are not contradictory, they should be considered as within the scope of protection of the present disclosure.

The above examples are merely several implementations of the present disclosure. Although the descriptions of the examples are relatively specific, they cannot be understood as limiting of the scope of protection present disclosure. It should be pointed out that several variations and improvements made by persons of ordinary skills in the art without departing from the idea of the present disclosure shall all fall within the scope of protection of the present disclosure. Therefore, the scope of protection of the present disclosure shall be indicated by the appended claims.

What is claimed is:

1. A method for preparing an aluminum alloy-containing powder comprising the following steps:

Step 1, select an initial alloy raw material, and melt the initial alloy raw material according to an initial alloy composition ratio to obtain a uniform initial alloy melt; a component of the initial alloy melt is $RE_aAl_bM_cT_d$; wherein, RE includes at least one of Y, La, Ce, Pr, Nd, Pm, Sm, Eu, Gd, Tb, Dy, Ho, Er, Tm, Yb, and Lu; M includes at least one of W, Cr, Mo, V, Ta, Nb, Zr, Hf, Ti, Fe, Co, and Ni; T is an impurity element and contains at least one of O, H, N, P, S, F, Cl; a, b, c, d are atomic percentages of respective elements, and $35\% \le a \le 99.7\%$, $0.1\% \le b \le 25\%$, $0.1\% \le c \le 35\%$, $0 \le d \le 10\%$;

Step 2, solidify the initial alloy melt into an initial alloy strip to generate a solidified structure of the initial alloy strip; the solidified structure of the initial alloy strip includes a matrix phase and a dispersed particle phase; the melting point of the matrix phase is lower than the melting point of the dispersed particle phase, and the dispersed particle phase is coated in the matrix phase; the average composition of the matrix phase comprises $RE_{x1}Al_{y1}T_{z1}$, the composition of the dispersed particle phase comprises $M_{x2}Al_{y2}T_{z2}$, x1, y1, z1, x2, y2, z2 are atomic percentages of respective elements, and $68\% \le x1 < 99.8\%$, $0.2\% \le y1 \le 30\%$, $0 \le z1 \le 30\%$; $77\% \le x2 \le 99.8\%$, $0.1\% \le y2 \le 22\%$, $0 \le z2 \le 1.5\%$, $z2 \le d \le z1$; during the solidification of the initial alloy melt, the impurity element T in the initial alloy melt is redistributed in the dispersed particle phase and the matrix phase, and is enriched in the matrix phase, so that the dispersed particle phase is purified; and Step 3, the initial alloy strip is reacted with an acid solution, the matrix phase in the initial alloy strip reacts with the acid solution to become ions entering the solution, and the dispersed particle phase that does not react with the acid solution is removed from the initial alloy; and the initial alloy strip is separated out to obtain an aluminum alloy-containing powder material whose component is $M_{x2}Al_{y2}T_{z2}$.

2. The method for preparing an aluminum alloy-containing powder according to claim 1, wherein a source of impurity elements in the initial alloy melt includes: impurities introduced from the initial alloy raw material, or impurities introduced from an atmosphere or a crucible during a smelting process.

3. The method for preparing an aluminum alloy-containing powder according to claim 1, wherein the particle size range of the dispersed particle phase is 2 nm to 3 mm.

4. The method for preparing an aluminum alloy-containing powder according to claim 1, wherein no less than 75% of the total number of dispersed particles are single crystal particles.

5. The method for preparing an aluminum alloy-containing powder according to claim 1, wherein y1>y2.

6. The method for preparing an aluminum alloy-containing powder according to claim 1, wherein z2≤d≤z1, and 2*z2≤z1.

7. The method for preparing an aluminum alloy-containing powder according to claim 1, wherein the particle size of the aluminum alloy-containing powder material ranges from 2 nm to 3 mm.

8. A method for preparing an aluminum alloy-containing powder comprising:

an initial alloy is provided, the composition of the initial alloy is $RE_{a}Al_{b}M_{c}$, wherein RE is selected from at least one of Y, La, Ce, Pr, Nd, Pm, Sm, Eu, Gd, Tb, Dy, Ho, Er, Tm, Yb, Lu, M is selected from at least one of W, Cr, Mo, V, Ta, Nb, Zr, Hf, Ti, a, b, c, are constituent elements in atomic percentage, and 0.1%≤b≤25%, 0.1%≤c≤35%, a+b+c=100%, a solidified structure of the initial alloy includes a matrix phase and a dispersed particle phase, the average composition of the matrix phase is $RE_{x1}Al_{y1}$, the composition of the dispersed particle phase is $M_{x2}Al_{y2}$, x1, y1, x2, and y2 are atomic percentages of respective elements, and 0.5%≤y1≤30%, 0.1%≤y2≤25%, x1+y1=100%, x2+y2=100%;

an acid solution is provided, and the initial alloy is mixed with the acid solution, so that the matrix phase in the initial alloy reacts with the acid solution to become metal ions, and the dispersed particle phase in the initial alloy is detached to obtain a mixture containing an aluminum alloy-containing powder, the composition of the aluminum alloy-containing powder is $M_{x2}Al_{y2}$.

9. The method for preparing an aluminum alloy-containing powder according to claim 8, wherein the initial alloy is obtained by the following method:

weigh raw materials according to a proportion;

fully melting the raw material to obtain an alloy melt;

the initial alloy is obtained by solidifying the alloy melt, wherein the solidification rate is $0.001K/s^-10^7K/s$.

10. The method for preparing an aluminum alloy-containing powder according to claim 8, wherein y1>y2.

11. The method for preparing an aluminum alloy-containing powder according to claim 8, wherein the particle shape of the dispersed particle phase comprises at least one of a dendritic shape, a spherical shape, a near-spherical shape, a square shape, and a rod shape, and the particle size of the dispersed particle phase is 2 nm to 50 mm.

12. The method for preparing an aluminum alloy-containing powder according to claim 8, wherein the acid in the acid solution comprises at least one of sulfuric acid, hydrochloric acid, nitric acid, perchloric acid, phosphoric acid, acetic acid, oxalic acid, formic acid, and carbonic acid, and the molar concentration of the acid is 0.001 mol/L to 20 mol/L.

13. The method for preparing an aluminum alloy-containing powder according to claim 8, wherein the reaction temperature of the matrix phase and the acid solution is 0° C. to 100° C., and the time is 0.1 min to 24 hours.

14. The method for preparing an aluminum alloy-containing powder according to claim 8, characterized in that, after the step of reacting the matrix phase with the acid solution, the following step is further performed: sieving a separated prefabricated powder, plasma spheroidizing treatment is performed to obtain aluminum alloy-containing powder with different particle sizes and spherical shape.

* * * * *